(12) United States Patent
Nakaniwa (10) Patent No.: US 10,107,623 B2
(45) Date of Patent: Oct. 23, 2018

(54) OPTICAL DEVICE, RETICLE INCORPORATED IN THE OPTICAL DEVICE, AND SURVEY METHOD USING THE OPTICAL DEVICE

(71) Applicant: KUMONOS Corporation, Minoo-shi, Osaka (JP)

(72) Inventor: Kazuhide Nakaniwa, Minoo (JP)

(73) Assignee: Kumonos Corporation, Minoo-shi, Osaka (JP)

( * ) Notice: Subject to any disclaimer, the term of this patent is extended or adjusted under 35 U.S.C. 154(b) by 0 days.

(21) Appl. No.: 15/559,983

(22) PCT Filed: Nov. 25, 2016

(86) PCT No.: PCT/JP2016/084914
§ 371 (c)(1),
(2) Date: Sep. 20, 2017

(87) PCT Pub. No.: WO2017/090707
PCT Pub. Date: Jun. 1, 2017

(65) Prior Publication Data
US 2018/0073872 A1    Mar. 15, 2018

(30) Foreign Application Priority Data

Nov. 25, 2015  (JP) ................. 2015-229485
Jun. 6, 2016   (JP) ................. 2016-112969

(51) Int. Cl.
*G01C 3/04*  (2006.01)
*G01C 3/06*  (2006.01)

(52) U.S. Cl.
CPC ............. *G01C 3/04* (2013.01); *G01C 3/06* (2013.01)

(58) Field of Classification Search
CPC ... G01C 3/04; G01C 3/06; G01C 3/08; G01C 1/00; G01C 1/02; G01C 5/00;
(Continued)

(56) References Cited

U.S. PATENT DOCUMENTS

2010/0095539 A1*  4/2010  Nakaniwa ............ G01C 15/00
                                                        33/284

FOREIGN PATENT DOCUMENTS

| JP | 2003-106838 A | 4/2003 |
| JP | 2009-92419 A  | 4/2009 |
| JP | 2013-217807 A | 10/2013 |

OTHER PUBLICATIONS

International Search Report (PCT/ISA/210) dated Feb. 14, 2017, 2016, by the Japanese Patent Office as the International Searching Authority for International Application No. PCT/JP2016/084914.
(Continued)

*Primary Examiner* — Jamil Ahmed
(74) *Attorney, Agent, or Firm* — Buchanan Ingersoll & Rooney PC (57) ABSTRACT

Disclosed herein is an optical device that determines the central coordinates of a large-diameter cylindrical structure. The optical device has the function of calculating the central coordinates of a cylindrical structure using the coordinates of a reference point of the optical device, the coordinates of a survey point on the cylindrical structure seen on the optical axis of a telescope in a state where one of right and left reference marks (e.g., a vertical line) coincides with the edge of the cylindrical structure and the optical axis is positioned on the surface of the cylindrical structure, and an aperture angle between the optical axis and the reference mark.

13 Claims, 11 Drawing Sheets

(58) Field of Classification Search
CPC .. G01C 15/00; G01C 1/04; G01S 5/16; G01S 17/89; G01B 11/00; G01B 11/26; G01B 11/27; E02D 11/00; E02D 13/06
See application file for complete search history.

(56) References Cited

OTHER PUBLICATIONS

Written Opinion (PCT/ISA/237) dated Feb. 14, 2017, by the Japanese Patent Office as the International Searching Authority for International Application No. PCT/JP2016/084914.

* cited by examiner

OPTICAL DEVICE, RETICLE INCORPORATED IN THE OPTICAL DEVICE, AND SURVEY METHOD USING THE OPTICAL DEVICE

TECHNICAL FIELD

The present invention relates to an optical device having a distance-measuring function. Further, the present invention relates to a reticle incorporated in the optical device. Further, the present invention relates to a survey method using the optical device.

BACKGROUND ART

Patent Document 1 (JP 2009-092419 A) discloses an optical device that can determine the central coordinates of a columnar body, such as a utility pole, or a columnar structure. This optical device has a telescope. In the telescope, a reticle is provided. On the reticle, a concentric scale having a plurality of circles or arcs is drawn around an optical axis. The purpose of use of the optical device is not particularly limited. For example, when the central coordinates of a columnar body are measured using this optical device, a circle having a diameter closest to the diameter of the columnar body (image) projected onto the reticle is first inscribed or substantially inscribed in the columnar body (image). Then, the distance from the optical device to the columnar body and the direction of the columnar body from the optical device are measured. Then, the central coordinates of the columnar body is determined using the measured distance and direction and known information (specifically, the machine coordinates (reference coordinates) of the optical device and the radius of the columnar body).

As described above, in order to determine the central coordinates of a columnar body using the optical device disclosed in Patent Document 1, both the right and left edges of the columnar body need to be projected onto the reticle. However, a telescope used in a common survey instrumentation (total station) has a very narrow angle of view (e.g., about 1 degree). Therefore, when the survey instrumentation is close to a columnar body, part of the columnar body is seen through an eyepiece lens (i.e., part of the columnar body is projected onto a reticle as an image), that is, it is difficult to allow both the right and left edges of the columnar body to be included in one image at the same time. For this reason, in order to allow a survey instrumentation or the like to satisfy the above requirement, a columnar body needs to have a quite small diameter, or the survey instrumentation needs to keep enough distance from a columnar body. However, when the central coordinates of a pile, which is a cylindrical structure that functions as a foundation for a building, are measured to determine the condition of the pile that is being driven (i.e., to determine whether or not the pile is being properly driven in a proper position), the survey instrumentation needs to keep a distance of about 30 meters or more from the pile, because the pile generally has an outer diameter of about 30 centimeters or more. However, at a construction site where buildings are concentrated, there are cases where the survey instrumentation cannot keep enough distance from a pile. Particularly, in recent years, a high-rise building is often constructed at a site where buildings are concentrated. In this case, it is substantially difficult to determine the central coordinates of a large-diameter pile whose diameter is larger than one meter.

PRIOR ART DOCUMENT

Patent Document

Patent Document 1: JP 2009-092419 A

SUMMARY OF THE INVENTION

Problems to be Solved by the Invention

Under the above circumstances, there is demand for a device and method capable of simply and easily measuring the central coordinates of a columnar body even when the device cannot keep enough distance from the columnar body.

Means for Solving the Problems

In order to achieve the above object, the present invention is directed to an optical device (10) having a function of measuring a distance (L) from a reference point ($P_0$) to a survey point ($P_1$) seen on an optical axis (18) of a telescope (16), the optical device (10) including:
a reticle (44) fixed in the telescope (16),
the reticle (44) having right and left reference marks (56) provided on both sides of the optical axis (18) and in positions away at a predetermined distance from the optical axis (18) in a horizontal direction; and
a calculation part (32) that calculates central coordinates of a cylindrical structure (90) using coordinates ($x_a$, $y_a$) of the reference point $P_0$ of the optical device (10), coordinates ($x_b$, $y_b$) of the point ($P_1$) on the cylindrical structure (90) seen on the optical axis (18) in a state where only one of the right and left reference marks (56) coincides with an edge (91) of the cylindrical structure (90) and the optical axis (18) is positioned on a surface of the cylindrical structure (90), an aperture angle (θ) between the optical axis (18) and the reference mark (56), and a radius (r) of the cylindrical structure (90).

The present invention is also directed to a reticle (44) fixed in a telescope (16) of an optical device (10) having a function of measuring a distance (L) from a reference point ($P_0$) to a survey point ($P_1$) seen on an optical axis (18) of the telescope (16), the reticle (44) including:
right and left reference marks (56) provided on both sides of the optical axis (18) and in positions away at a predetermined distance from the optical axis (18) in a horizontal direction, wherein
the optical device (10) has a function of calculating central coordinates of a cylindrical structure (90) using coordinates ($x_a$, $y_a$) of the reference point $P_0$ of the optical device (10), coordinates ($x_b$, $y_b$) of the point ($P_1$) on the cylindrical structure (90) seen on the optical axis (18) in a state where only one of the right and left reference marks (56) coincides with an edge (91) of the cylindrical structure (90) and the optical axis (18) is positioned on a surface of the cylindrical structure (90), an aperture angle (θ) between the optical axis (18) and the reference mark (56), and a radius (r) of the cylindrical structure (90).

The present invention is also directed to a survey method including the steps of:
preparing an optical device (10) that has a function of measuring a distance (L) from a reference point ($P_0$) to a survey point ($P_1$) seen on an optical axis (18) of a telescope (16) and that includes a reticle (44) fixed in the telescope (16), the reticle (44) including:

right and left reference marks (56) drawn on both sides of the optical axis (18) and in positions away at a predetermined distance from the optical axis (18) in a horizontal direction;

allowing only one of the right and left reference marks (56) to coincide with an edge (91) of a cylindrical structure (90) and positioning the optical axis (18) on a surface of the cylindrical structure (90); and calculating central coordinates of the cylindrical structure (90) using coordinates ($x_a$, $y_a$) of the reference point $P_0$ of the optical device (10), coordinates ($x_b$, $y_b$) of the survey point ($P_1$) on the cylindrical structure (90) seen on the optical axis (18), an aperture angle (θ) between the optical axis (18) and the reference mark (56), and a radius (r) of the cylindrical structure (90).

Preferably, the reticle (44) has a plurality of circles (55) drawn around the optical axis (18) as a center.

Preferably, the predetermined distance corresponds to about 0.01 radians.

Preferably, each of the circles (55) has a radius n times (n: integer) a predetermined length δ.

Preferably, the predetermined length δ corresponds to about 0.001 radians.

Preferably, the circles 55 include a reference circle having a radius 10 times the predetermined length δ, and the reference marks 56 touch the reference circle.

Effects of the Invention

According to the present invention, the central coordinates of a cylindrical structure can be simply and easily measured and quickly determined to correct the tilt of the cylindrical structure if necessary only by allowing one of the right and left reference marks to coincide with the edge of the cylindrical structure and positioning the optical axis on the surface of the cylindrical structure even at a site where any of the circles drawn on the reticle cannot be inscribed in both the edges of the cylindrical structure.

EMBODIMENTS OF THE INVENTION

Hereinbelow, an optical device according to the present invention will be described with reference to the accompanying drawings. It is to be noted that in the description and claims, the "optical device" includes a telescope, a collimating device having a telescope, and an optical device having a collimating function and a distance-measuring function. The "cylindrical structure" includes a structure having a cylindrical peripheral surface (which may or may not have an inner hollow portion) such as an architecture, a facility, or a pile to be driven into the ground. The cylindrical structure does not need to have a uniform outer diameter, and includes a cylindrical structure different in outer diameter from place to place (e.g., a structure having a conical shape, a truncated conical shape, or a gourd-like shape).

<<1-1: Optical Device>>

Figure 1:
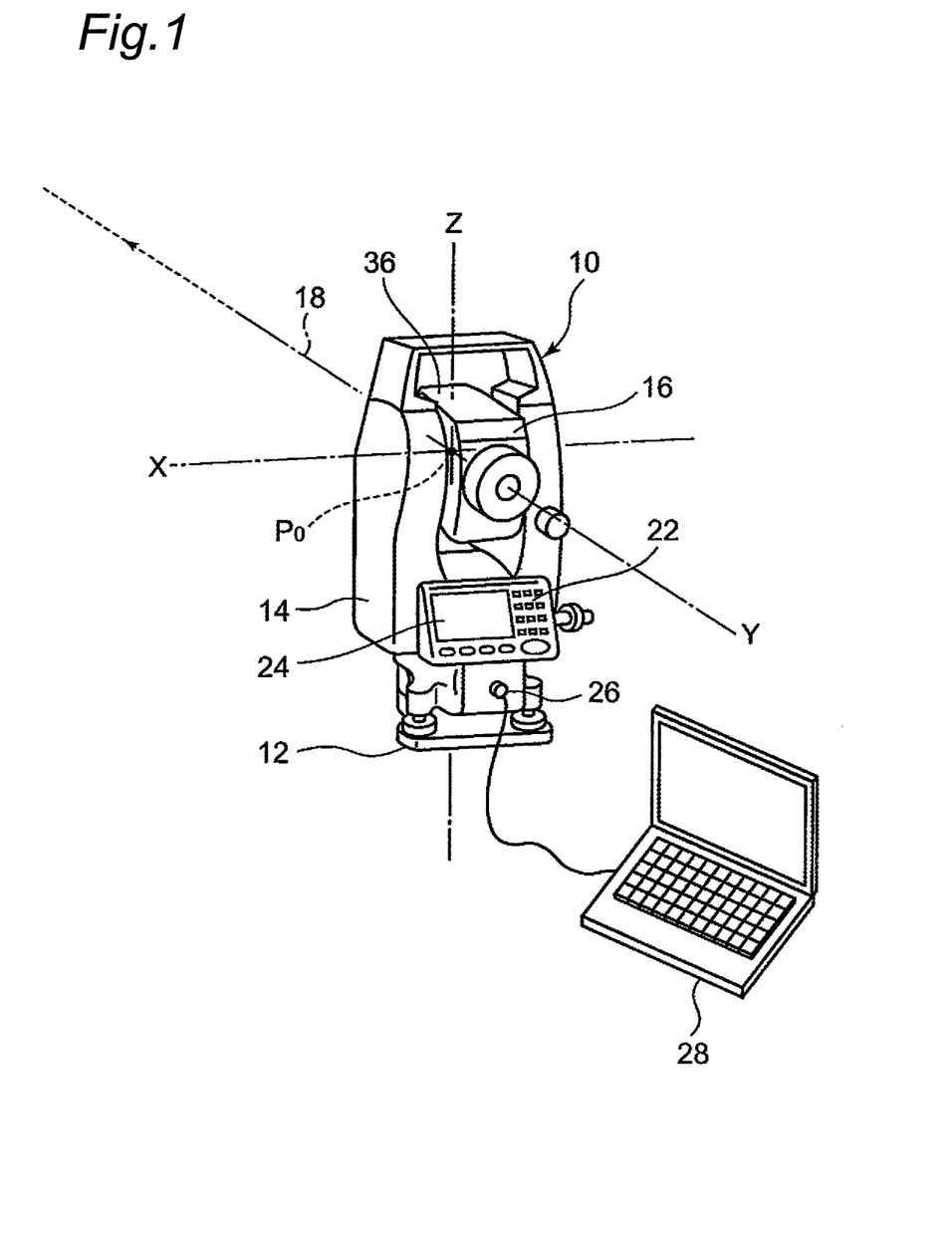
FIG. 1 is a perspective view of an optical device that is an embodiment of an optical device according to the present invention.

FIG. 1 shows a laser optical device (total station) 10 that is an embodiment of an optical device according to the present invention. As in the case of a conventional optical device, the optical device 10 includes a base 12 that is detachably attached and fixed to a tripod stand not shown, a main body 14 attached to the base 12 so as to be rotatable around a vertical axis (Z axis), and a telescope 16 attached to the main body 14 so as to be rotatable around a horizontal axis (X axis) orthogonal to the vertical axis (Z axis). An optical axis (Y axis) 18 of the telescope 16 passes through an intersection point of the vertical axis (Z axis) and the horizontal axis (X axis). Hereinafter, an intersection point of these three axes, that is, the vertical axis (Z axis), the horizontal axis (X axis), and the optical axis (Y axis) is referred to as a reference point $P_0$, reference coordinates, or machine coordinates. The optical device 10 further includes a measuring means or a measuring unit (denoted by reference symbol 20 in FIG. 2) that measures the distance from an object (not shown) collimated by the telescope 16 and the elevation angle (i.e., the angle between the horizontal axis X and the optical axis 18 in a vertical plane) of the telescope 16 at the time when the distance is measured. In this embodiment, the optical device 10 includes an input part 22 for inputting data necessary for survey, a display part 24 that displays survey results or the like, and an output part 26 that outputs data input from the input part 22 and data of survey results to another device (e.g., a computer 28).

Figure 2:
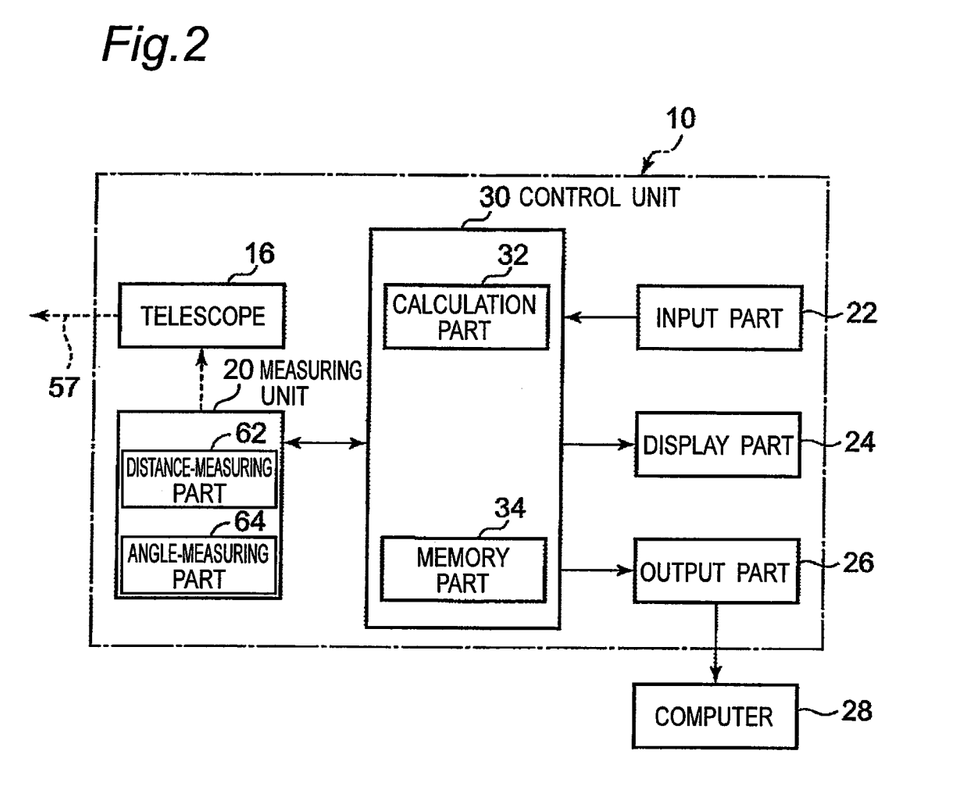
FIG. 2 is a block diagram showing the structure and functions of the optical device shown in FIG. 1.

FIG. 2 is a block diagram showing the structure of the optical device 10 from a functional viewpoint. As shown in the drawing, the optical device 10 includes a control unit 30. The control unit 30 is electrically connected to the measuring unit 20, the input part 22, the display part 24, and the output part 26. As will be described later in detail, the control unit 30 comprehensively controls these measuring unit 20, input part 22, display part 24, and output part 26. The control unit 30 has a calculation part 32 that calculates the central coordinates of a cylindrical structure, and a memory part 34 that stores programs and data necessary for calculation. Although not shown, the optical device 10 includes other components necessary for survey, such as a leveling instrument and an angle-measuring part.

<<1-2: Telescope>>

Figure 3:
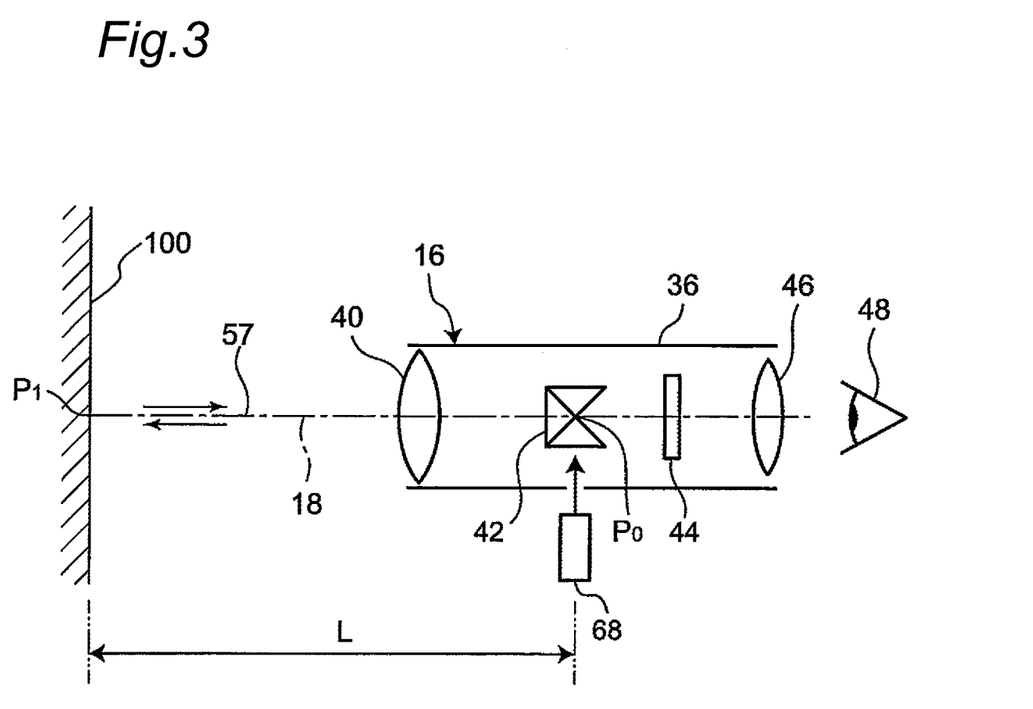
FIG. 3 is a sectional view schematically showing the structure of a telescope of the optical device shown in FIG. 1.

FIG. 3 shows a schematic structure of the telescope 16. As shown in the drawing, the telescope 16 has a lens barrel 36 in which an objective lens 40, an erect prism 42, a reticle (projection plate) 44, and an eyepiece lens 46 are provided in this order along the optical axis 18 from the object side toward the survey operator side (in the drawing, from the left side toward the right side) so that a collimated object image is formed on the reticle 44 through the objective lens 40 and the erect prism 42. This allows an operator 48 to observe the object image under magnification through the eyepiece lens 46.

<<1-3: Reticle and Gages>>

Figure 4:
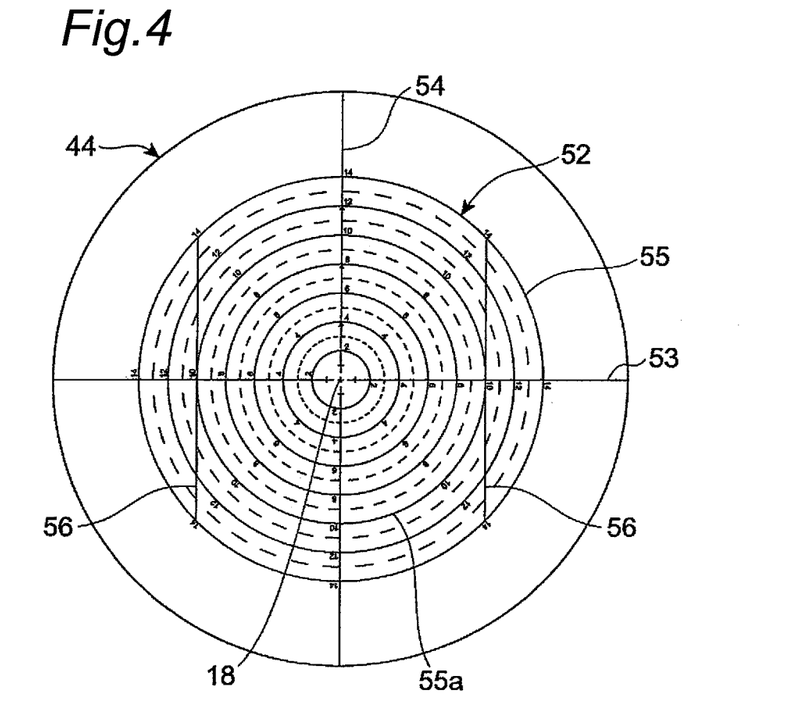
FIG. 4 is an enlarged front view of a reticle shown in FIG. 3.
Figure 5:
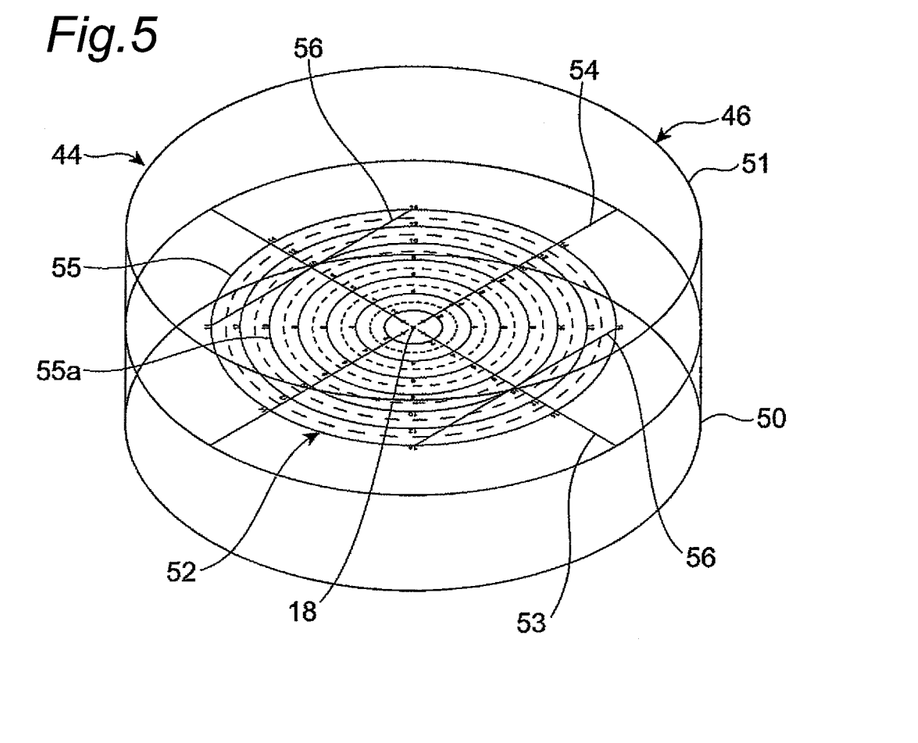
FIG. 5 is an enlarged perspective view of the reticle shown in FIG. 3.

FIGS. 4 and 5 show the reticle 44. In this embodiment, the reticle 44 is formed by laminating transparent quartz substrates 50 and 51. The upper surface of the lower quartz substrate 50 or the lower surface of the upper quartz substrate 51 has a scale 52 formed by known photolithography to have a pattern that will be described later. A method for drawing the scale 52 is not particularly limited.

In this embodiment, the scale 52 has a horizontal axis (line) 53 and a vertical axis (line) 54, which intersect at a right angle at the optical axis 18, and a plurality of concentric circles (hereinafter, referred to as "gages") 55 drawn around the optical axis 18 as a center. In this embodiment, the circles are perfect circles, but may be imperfect circles in the form of segments of circles or arcs. In this embodiment, the gages drawn in solid lines and the gages drawn in dotted lines are alternately provided, but all the gages may be drawn in solid lines or dotted lines. The radius of each of the gages 55 is an integral multiple of a predetermined reference length δ. In this embodiment shown in the drawings, the scale 52 has the fourteen gages 55 whose radii are δ to 14δ. However, the gage having the smallest radius (δ) is not shown in the drawings to avoid complicating the drawings.

The scale 52 further has reference marks provided on both right and left sides of the optical axis 18 so as to be parallel to the vertical axis 54 and to touch a gage (reference circle) 55a having a radius of 10δ. In this embodiment, the reference marks are vertical lines 56 that longitudinally extend in parallel with the vertical axis 54.

The reference length δ is 0.226 mm on the reticle 44. This distance corresponds to an aperture angle (i.e., an angle between the optical axis and a line that intersects with the optical axis) of about 0.001 radians. For example, when a point that is on a vertical plane 10 m away from the reference point $P_0$ of the optical device along the optical axis 18 and that is 10 mm away from the optical axis 18 is observed, the point is seen on the concentric circle having the smallest radius δ. A gage number, the radius of each of the concentric circles, and the aperture angle between a line (tangent) connecting the reference point with each of the concentric circles and the optical axis (expressed in degrees and radians) are shown in Table 1.

TABLE 1

| Gage Number | Radius of Concentric Circle (mm) | Degree | Minute | Second | Degree | rad |
|---|---|---|---|---|---|---|
| 1 | 0.226 | 0 | 3 | 26 | 0.057296 | 0.001000000 |
| 2 | 0.452 | 0 | 7 | 53 | 0.114591 | 0.001999997 |
| 3 | 0.678 | 0 | 10 | 19 | 0.171887 | 0.002999991 |
| 4 | 0.904 | 0 | 14 | 45 | 0.229182 | 0.003999979 |
| 5 | 1.130 | 0 | 17 | 11 | 0.286477 | 0.004999958 |
| 6 | 1.356 | 0 | 21 | 38 | 0.343771 | 0.005999928 |
| 7 | 1.582 | 0 | 24 | 4 | 0.401064 | 0.006999886 |
| 8 | 1.808 | 0 | 28 | 30 | 0.458356 | 0.007999829 |
| 9 | 2.034 | 0 | 31 | 56 | 0.515648 | 0.008999757 |
| 10 | 2.260 | 0 | 34 | 23 | 0.572939 | 0.009999667 |
| 11 | 2.486 | 0 | 38 | 49 | 0.630228 | 0.010999556 |
| 12 | 2.712 | 0 | 41 | 15 | 0.687516 | 0.011999424 |
| 13 | 2.938 | 0 | 45 | 41 | 0.744803 | 0.012999268 |
| 14 | 3.164 | 0 | 48 | 8 | 0.802089 | 0.013999085 |

<<1-4: Measuring Unit>>

As shown in FIG. 2, the measuring unit 20 has a distance-measuring part 62 that measures the slope distance between an object collimated by the telescope 16 and the reference coordinates $P_0$, and an angle-measuring part 64 that measures the azimuth angle of the telescope 16. In an actual survey, the elevation angle of the telescope 16 is measured, and a distance is calculated in consideration of this elevation angle. However, for ease of explanation, it is assumed that the following operation is performed in a state where the optical axis 18 of the telescope 16 is oriented in a horizontal direction. Further, the following operation for determining the central coordinates of a cylindrical structure can be performed in a state where the telescope is horizontal or almost horizontal. Therefore, it is considered that there is no problem with such an assumption.

Figure 6:
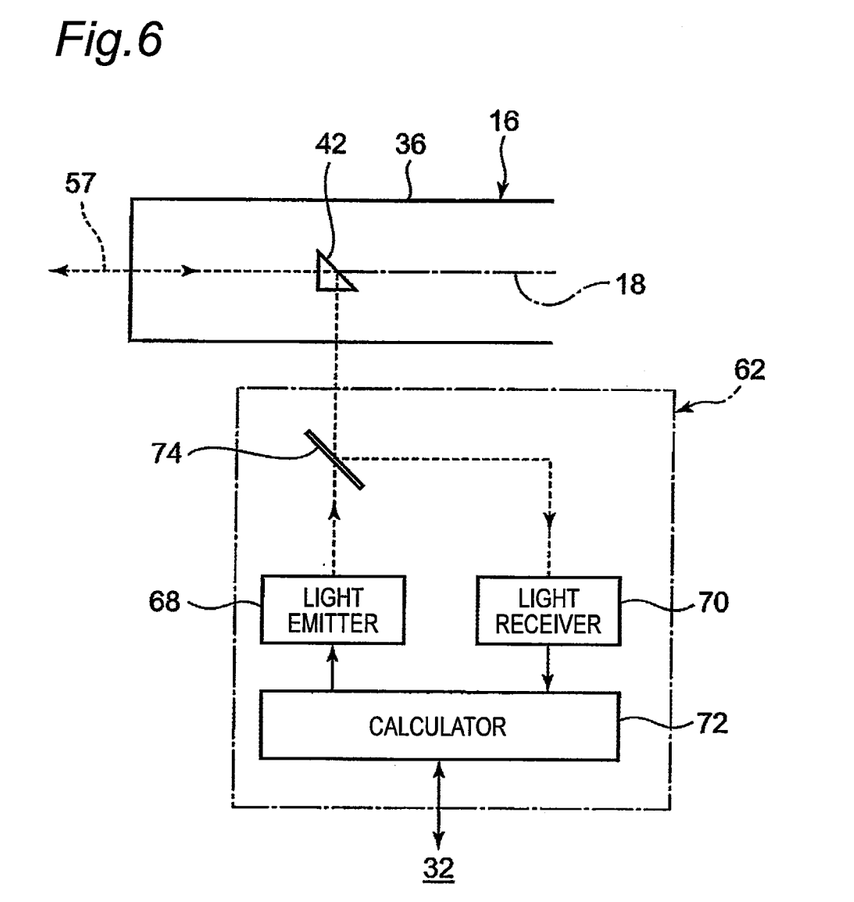
FIG. 6 is a diagram showing the structure of a distance-measuring part.

As shown in FIG. 6, the distance-measuring part 62 has a light emitter (laser) 68 that emits a laser beam 57, such as a laser diode, a calculator 72 that calculates a distance L (see FIG. 3) from a survey point (laser irradiation point) $P_1$ of an object 100 to the reference point $P_0$ based on the time from the emission of the laser beam 57 to the reception of the laser beam reflected from the object, and an optical system 74 that guides the laser beam 57 emitted from the light emitter 68 to the object along the optical axis 18 of the telescope 16 and that guides the laser beam 57 reflected from the object along the optical axis 18 to a light receiver 70. As shown in the drawing, the prism 42 constituting part of the optical system 74 is provided inside the telescope 16 so that the path of the laser beam 57 coincides with the optical axis 18 of the telescope 16. It is to be noted that a method for calculating a distance by the distance-measuring part 62 is not limited to the method using the time from the emission to the reception of light. For example, distance calculation may be performed using a phase difference between them.

<<1-5: Input Part>>

Figure 7:
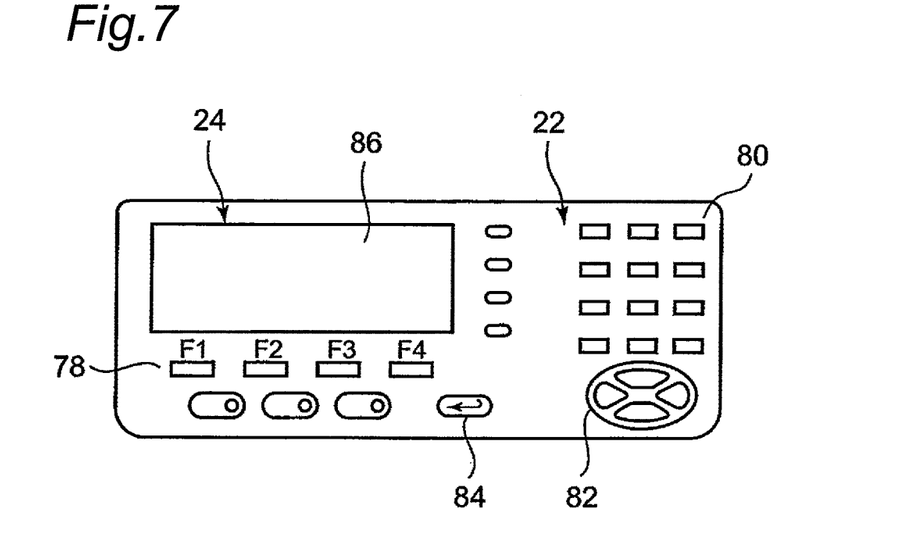
FIG. 7 is an illustration showing the details of an input part and a display part shown in FIG. 1.

As shown in FIG. 7, the input part 22 has a plurality of keys such as function keys 78, keys of numeric keypad 80, cursor-control keys 82, and an enter key 84. Here, the function keys 78 are used to give an instruction that measurement that will be described later should be started. Further, the keys of numeric keypad 80 are used to input a gage number read from the scale 52 of the reticle 44.

<<1-6: Display Part>>

Referring again to FIG. 1, the display part 24 has a liquid crystal display. On the liquid crystal display, information such as values measured by the measuring unit 20 (e.g., distance, elevation angle, and azimuth angle), a gage number input through the keys of numeric keypad 80, and calculation results obtained by the calculation part 32 is displayed.

<<1-7: Output Part>>

The output part 26 outputs various information (e.g., measurement results) displayed on the display part 24 or various information not displayed on the display part 24 (e.g., survey data stored in the optical device) to the computer 28 connected to the output part 26.

<<2-1: Calculation of Central Coordinates>>

Figure 8:
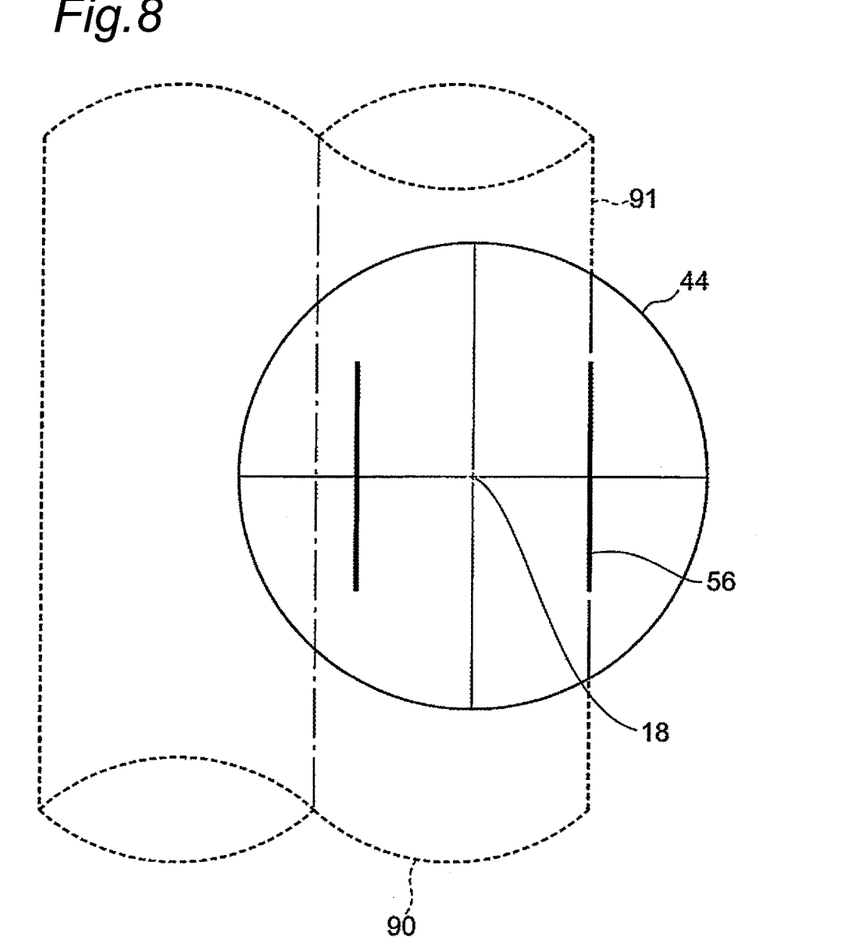
FIG. 8 is an illustration showing a situation in which a cylindrical structure is collimated using the optical device.

A process for determining the central coordinates of a large-diameter cylindrical structure (e.g., a large-diameter cylindrical pile) using the optical device 10 will be described. The process will be described on the assumption that, as shown in FIG. 8, a cylindrical structure 90 has a large diameter, and therefore the full width of the cylindrical structure 90 is not projected onto the reticle 44. In this case, as shown in the drawing, an operator allows one of the vertical lines 56 of the reticle 44 (in the drawing, the right-hand vertical line) to coincide with an edge 91 of the cylindrical structure 90 in a state where the optical axis 18 is positioned on the peripheral surface of the cylindrical structure 90. Then, in this state, the operator appropriately presses a key of the input part 22 (distance survey start key) to measure the distance from the reference point $P_0$ to the survey point $P_1$ (which corresponds to a point B that will be described later with reference to FIGS. 9 to 12) on the optical axis 18 positioned on the peripheral surface of the cylindrical structure 90. The measured distance is output to the calculation part 32 in the control unit 30. The calculation part 32 determines the coordinates of the survey point $P_1$ based on the measured distance L, the coordinates of the reference point $P_0$, the azimuth angle of the telescope 16 (optical axis 18), etc. Then, the operator appropriately presses a key (central coordinate calculation key) of the input part 22. This allows the calculation part 32 to calculate the central coordinates of the cylindrical structure 90 based on calculation, which will be described later, using the coordinates of the reference point $P_0$, the coordinates of the survey point $P_1$, the diameter (known) of the cylindrical structure 90, and the aperture angle (10δ) between the optical axis 18 and the vertical line 56. If necessary, the calculated central coordinates are displayed on the display part 24. The central coordinates of the cylindrical structure 90 may be calculated simply by pressing the distance survey start key in a state where the vertical line 56 of the reticle 44 coincides with the edge 91 of the cylindrical structure 90 without pressing the central coordinate calculation key (i.e., simply by pressing one key).

Hereinbelow, a method for calculating the central coordinates of the cylindrical structure will be described. It is to be noted that for ease of explanation, the method will be described on the assumption that the reference point $P_0$ and the survey point $P_1$ are positioned on the same horizontal plane.

Figure 9:
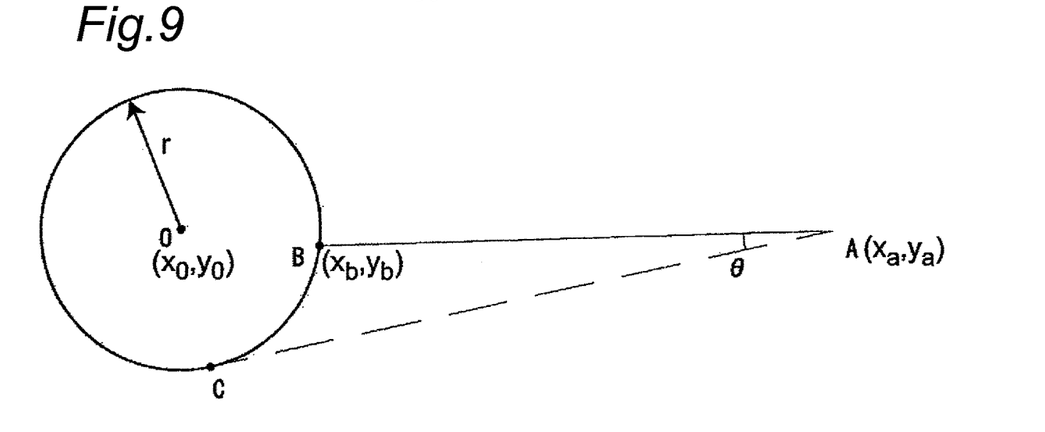
FIG. 9 is an illustration for explaining a process for determining the central coordinates of a cylindrical structure.

Referring to FIG. 9, the reference point is defined as a point A ($x_a$, $y_a$), the survey point is defined as a point B ($x_b$, $y_b$), and the central coordinates to be determined is defined as a point O ($x_o$, $y_o$). A circle having the point O ($x_o$, $y_o$) as its center and a radius r is defined as a circle O. The circle O corresponds to the peripheral surface of the cylindrical structure 90 and is represented by the following formula 1.

[Formula 1]

$$(x-x_0)^2+(y-y_0)^2=r^2 \quad (1)$$

A straight line that passes through the point A and touches the circle O is defined as a straight line AC, and a contact point between the circle O and the straight line AC is defined as a point C. Further, the intersection angle between a straight line AB connecting the point A with the point B and the straight line AC is defined as θ (which corresponds to an aperture angle of 10δ).

Figure 10:
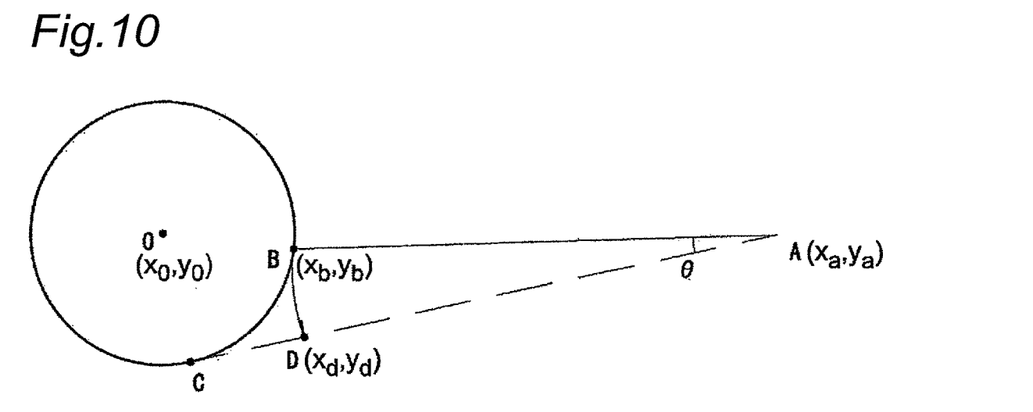
FIG. 10 is an illustration for explaining the process for determining the central coordinates of a cylindrical structure together with FIG. 9.

As shown in FIG. 10, when a point obtained by rotating the point B by an angle θ around the point A is defined as a point D ($x_d$, $y_d$), the coordinates of the point D are represented by the following formulas 2 and 3.

[Formula 2]

$$x_d=(x_b-x_a)\cos\theta-(y_b-y_a)\sin\theta+x_a \quad (2)$$

[Formula 3]

$$y_d=(x_b-x_a)\sin\theta+(y_b-y_a)\cos\theta+y_a \quad (3)$$

The point D is positioned on the straight line AC, and therefore the straight line AC is represented by the following formula 4 using the coordinates of the points A and D.

[Formula 4]

$$(x_d-x_a)(y-y_a)=(y_d-y_a)(x-x_a) \quad (4)$$

The slope (m) of the straight line AC and the unit vector (u) of the normal to the straight line AC are represented by the following formulas 5 and 6.

[Formula 5]

$$\text{Slope } m = \frac{y_d - y_a}{x_d - x_a} \quad (5)$$

[Formula 6]

$$\text{Unit vector } \vec{u} = \frac{1}{\sqrt{(y_d-y_a)^2+(x_a-x_d)^2}}(y_d-y_a, x_a-x_d) \quad (6)$$

Figure 11:
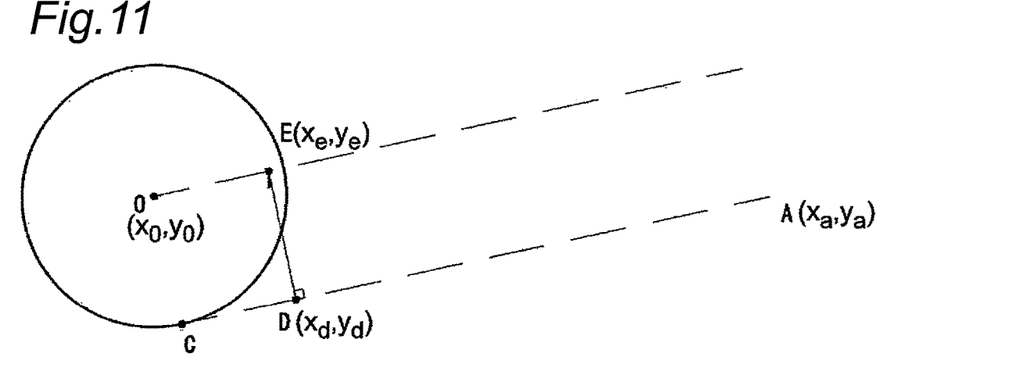
FIG. 11 is an illustration for explaining the process for determining the central coordinates of a cylindrical structure together with FIGS. 9 and 10.

As shown in FIG. 11, a point E ($x_e$, $y_e$) obtained by shifting the point D by a distance of r in a u direction is represented by the following formulas 7, 8, and 9.

[Formula 7]

$$(x_e, y_e) = (x_d, y_d) \pm r\vec{u} \quad (7)$$

[Formula 8]

$$x_e = x_d \pm \frac{r}{\sqrt{(y_d-y_a)^2+(x_a-x_d)^2}}(y_d-y_a) \quad (8)$$

[Formula 9]

$$y_e = y_d \pm \frac{r}{\sqrt{(y_d-y_a)^2+(x_a-x_d)^2}}(x_a-x_d) \quad (9)$$

As is clear from the formulas 8 and 9, two pairs of $x_e$, $y_e$ are obtained by these formulas, but one of the pairs of $x_e$, $y_e$ is used which gives a larger value when substituted into the following formula 10.

[Formula 10]

$$\sqrt{(x_b-x_e)^2+(y_b-y_e)^2} \quad (10)$$

Figure 12:
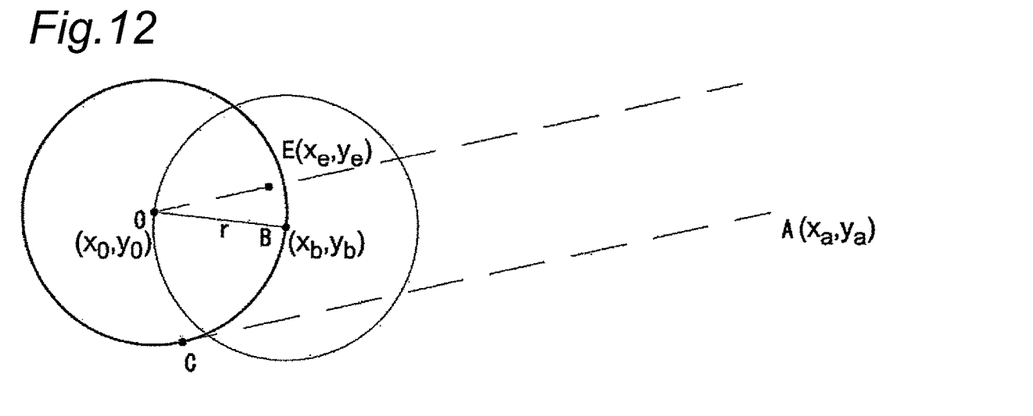
FIG. 12 is an illustration for explaining the process for determining the central coordinates of a cylindrical structure together with FIGS. 9 to 11.

A straight line EO that passes through the point E and is parallel to the straight line AC (the straight line EO has a slope m) is represented by the following formula 11.

[Formula 11] (11)

$$y = \left(\frac{y_d - y_a}{x_d - x_a}\right)x + y_e - \left(\frac{y_d - y_a}{x_d - x_a}\right)x_e$$

Here, α and β are represented by the following formulas.

[Formula 12] (12)

$$\alpha = \frac{y_d - y_a}{x_d - x_a}$$

[Formula 13] (13)

$$\beta = y_e - \left(\frac{y_d - y_a}{x_d - x_a}\right)x_e$$

Therefore, the formula 11 is represented by the following formula 14.

[Formula 14]

$$y = \alpha x + \beta \quad (14)$$

The distance between the point D and the point E is equal to the radius r of the circle O, and therefore a line that passes through the point E and is parallel to the straight line AC passes through the point O.

A circle B having the point B as its center and a radius r is represented by the following formula 15.

[Formula 15]

$$(x-x_b)^2 + (y-y_b)^2 = r^2 \quad (15)$$

The center O ($x_o$, $y_o$) of the circle O is given by the following formulas 16 and 17 based on the formulas 2, 3, 8, 9, 11, 14, and 15.

[Formula 16] (16)

$$x_0 = \frac{x_b + ay_b - \alpha\beta \pm \sqrt{(\alpha\beta - ay_b - x_b)^2 - (a^2+1)(x_b^2 + \beta^2 + y_b^2 - 2\beta y_b - r^2)}}{\alpha^2 + 1}$$

[Formula 17] (17)

$$y_0 = \alpha x_0 + \beta$$

As is clear from the formula 16, $x_o$ obtained by these formulas has two values. However, one of these two values that gives a larger distance AO (given by the following formula 18) is used as a true point O.

[Formula 18]

$$\sqrt{(x_0 - x_a)^2 + (y_0 - y_a)^2} \quad (18)$$

Figure 13:
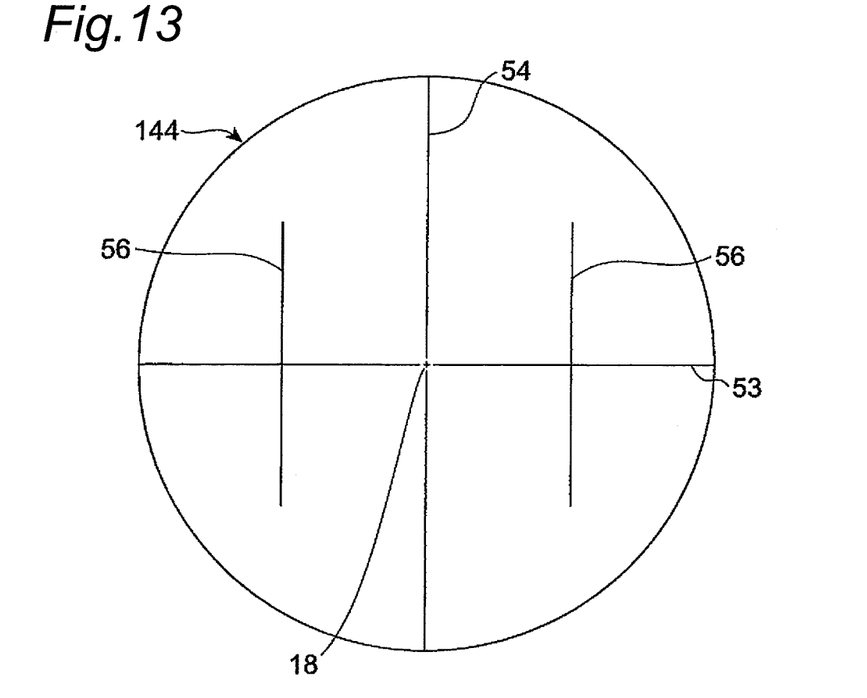
FIG. 13 is an enlarged front view of a reticle according to another embodiment.
Figure 14:
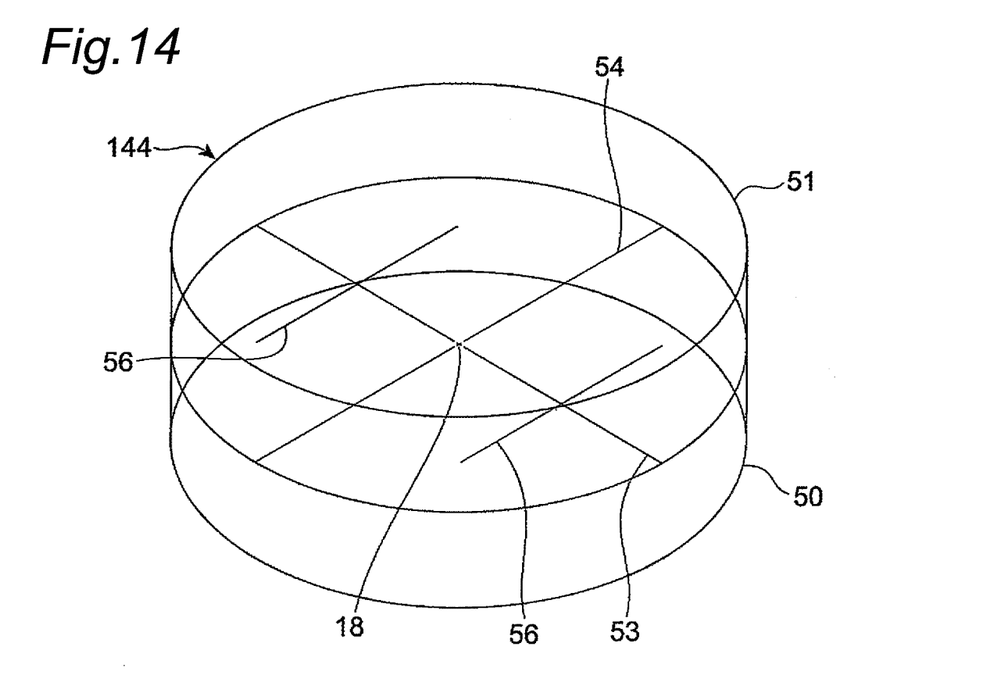
FIG. 14 is an enlarged perspective view of the reticle according to another embodiment.

The reticle 44 having a plurality of concentric circles as the gages 55 has been described above, but as shown in FIGS. 13 and 14, a reticle 144 having no gages is also within the scope of the present invention. The central coordinates of a cylindrical structure can be determined also by such an embodiment in such a manner as described above.

Figure 15:
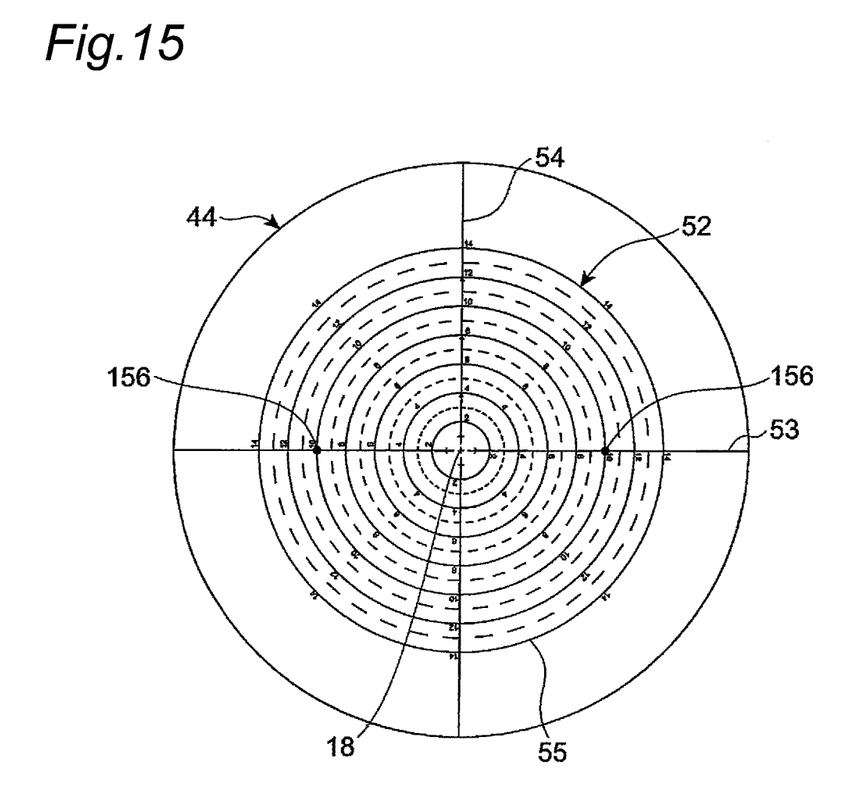
FIG. 15 is an enlarged front view of a reticle according to another embodiment.

Further, the vertical lines 56 have been described above as reference marks, but any mark such as a rectangular mark, a circular mark, or a star-shaped mark may be used as a reference mark. For example, FIG. 15 shows another embodiment of the reticle, which has circular marks 156 as reference marks.

<<3. Method for Determining Central Coordinates of Rectangular Prism Structure>>

The above-described optical device having a reticle can calculate the central coordinates of a rectangular prism. A method for determining the central coordinates of a rectangular prism will be described below with reference to FIG. 16. It is to be noted that for ease of calculation, a height in vertical direction is neglected in the following description.

Figure 16:
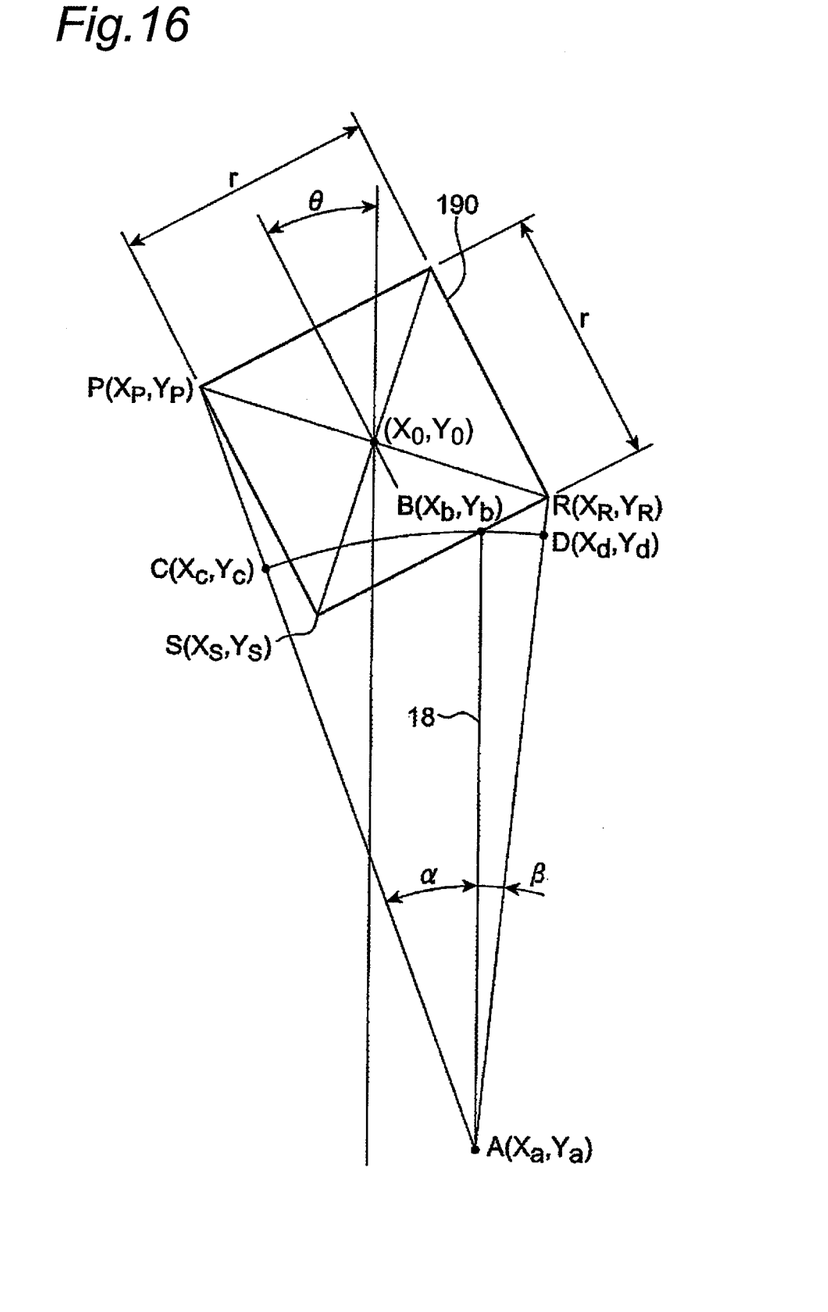
FIG. 16 is an illustration for explaining a method for determining the central coordinates of a rectangular prism structure.

In FIG. 16, reference symbol 190 denotes the cross section of a rectangular prism structure. The optical device 10 is placed at a point A ($x_a$, $y_a$) that is away from the rectangular prism structure 190. The rectangular prism structure 190 has a square cross-section with sides of length r, and is rotated by an angle θ relative to the optical axis 18 of the optical device 10. A point B is a point on the rectangular prism structure 190, which is positioned on the optical axis 18 of the optical device 10. The coordinates ($x_b$, $y_b$) of the point B can be determined from machine coordinates (i.e., the coordinates of the point A), the distance between the point A and the point B, and the azimuth angle of the point B relative to the point A (these distance and azimuth angle can be read by the optical device 10).

Unlike the above-described embodiment, it is assumed that points P and R on the both right and left vertical edges of the rectangular prism structure 190 can be visually recognized on the reticle. Further, it is assumed that the vertical edge that appears on the left side of the optical axis 18 and the vertical edge that appears on the right side of the optical axis 18 in the drawing touch the different circles 55 on the reticle 44.

In this state, an angle α between a line connecting the point A with the point B (optical axis 18) and a line connecting the point A with the point P is calculated from the gage number of the circle 55 that touches the vertical edge including the point P. Similarly, an angle β between a line connecting the point A with the point B (optical axis 18) and a line connecting the point A with the point R is calculated from the gage number of the circle 55 that touches the vertical edge including the point R.

The coordinates ($x_c$, $y_c$) of a point (point C) that is positioned on the line connecting the point A with the point P and that is obtained by rotating the point B by the angle α around the point A and the coordinates ($x_d$, $y_d$) of a point (point D) that is positioned on the line connecting the point A with the point R and that is obtained by rotating the point B by the angle β around the point A are represented by the following formulas (19) to (22) using the above information (i.e., the coordinates of the point A and the point B, and the angles α and β).

[Formula 19]
$$x_c=(x_b-x_a)\cos\alpha-(y_b-y_a)\sin\alpha+x_a \quad (19)$$

[Formula 20]
$$y_c=(x_b-x_a)\sin\alpha-(y_b-y_a)\cos\alpha+y_a \quad (20)$$

[Formula 21]
$$x_d=(x_b-x_a)\cos\beta-(y_b-y_a)\sin\beta+x_a \quad (21)$$

[Formula 22]
$$y_c=(x_b-x_a)\sin\beta-(y_b-y_a)\cos\beta+y_a \quad (22)$$

When the central coordinates of the rectangular prism structure are defined as $(x_o, y_o)$, the coordinates $(x_p, y_p)$ of the point P, the coordinates $(x_R, y_R)$ of the point R, and the coordinates $(x_s, y_s)$ of a point S are represented by the following formulas (23) to (28). The point S is the corner of the rectangular prism structure which appears between the point P and the point R.

[Formula 23]
$$x_p = -\frac{\sqrt{2}}{2}r\cos\theta + x_o \quad (23)$$

[Formula 24]
$$y_p = -\frac{\sqrt{2}}{2}r\sin\theta + y_o \quad (24)$$

[Formula 25]
$$x_R = \frac{\sqrt{2}}{2}r\cos\theta + x_o \quad (25)$$

[Formula 26]
$$y_R = \frac{\sqrt{2}}{2}r\sin\theta + y_o \quad (26)$$

[Formula 27]
$$x_s = \frac{\sqrt{2}}{2}r\sin\theta + x_o \quad (27)$$

[Formula 28]
$$y_s = \frac{\sqrt{2}}{2}r\cos\theta + y_o \quad (28)$$

A straight line AC connecting the point A with the point C is represented by the following formula 29.

[Formula 29]
$$(x_c-x_a)(y-y_a)=(y_c-y_a)(x-x_a) \quad (29)$$

The point P is positioned on an extension of the straight line AC, and therefore the formula 29 is represented by the following formula 30 using the coordinates $(x_p, y_p)$ of the point P.

[Formula 30]
$$(x_c-x_a)(y_p-y_a)=(y_c-y_a)(x_p-x_a) \quad (30)$$

A straight line AD connecting the point A with the point D is represented by the following formula 31.

[Formula 31]
$$(x_d-x_a)(y-y_a)=(y_d-y_a)(x-x_a) \quad (31)$$

The point R is positioned on an extension of the straight line AD, and therefore the formula 31 is represented by the following formula 32 using the coordinates $(x_R, y_R)$ of the point R.

[Formula 32]
$$(x_d-x_a)(y_R-y_a)=(y_d-y_a)(x_R-x_a) \quad (32)$$

A straight line RS connecting the point R with the point S is represented by the following formula 33.

[Formula 33]
$$(x_R-x_S)(y-y_S)=(y_R-y_S)(x-x_S) \quad (33)$$

A straight line PS connecting the point P with the point S is represented by the following formula 34.

[Formula 34]
$$(x_P-x_S)(y-y_S)=(y_P-y_S)(x-x_S) \quad (34)$$

The point B is positioned on the straight line RS or the straight line PS. Whether the point B is positioned on the straight line RS or the straight line PS can be judged visually or from a gage number.

When the point B is positioned on the straight line RS, the straight line RS is represented by the following formula 35.

[Formula 35]
$$(x_R-x_S)(y_b-y_S)=(y_R-y_S)(x_b-x_S) \quad (35)$$

When the point B is positioned on the straight line PS, the straight line PS is represented by the following formula 36.

[Formula 36]
$$(x_P-x_S)(y_b-y_S)=(y_P-y_S)(x_b-x_S) \quad (36)$$

The coordinate values of the points C, D, P, R, and S are substituted into the formulas 30, 32, and 35 (or 36) to organize the formulas so that the following formulas 37, 38, and 39 (or 40) are obtained.

[Formula 37]
$$(x_c - x_a)\left(-\frac{\sqrt{2}\,r\cos\theta}{2} + x_0 - y_a\right) = (y_c - y_a)\left(-\frac{\sqrt{2}\,r\sin\theta}{2} + y_o - x_a\right) \quad (37)$$

[Formula 38]
$$(x_d - x_a)\left(\frac{\sqrt{2}\,r\cos\theta}{2} + x_0 - y_a\right) = (y_d - y_a)\left(\frac{\sqrt{2}\,r\sin\theta}{2} + y_o - x_a\right) \quad (38)$$

[Formula 39]
$$(\cos\theta - \sin\theta)\left(y_b + \frac{\sqrt{2}\,r\cos\theta}{2} - y_o\right) = (\sin\theta + \cos\theta)\left(x_b - \frac{\sqrt{2}\,r\sin\theta}{2} - x_o\right) \quad (39)$$

[Formula 40]
$$(\cos\theta - \sin\theta)\left(y_b + \frac{\sqrt{2}\,r\cos\theta}{2} - y_o\right) = (-\sin\theta + \cos\theta)\left(x_b - \frac{\sqrt{2}\,r\sin\theta}{2} - x_o\right) \quad (40)$$

The known values r, $(x_a, y_a)$, $(x_b, y_b)$, and $(x_c, y_c)$ are substituted into the formulas 37, 38, and 39 or the formulas 37, 38, and 40 to determine the values of $x_0$, $y_0$, and $\theta$. Further, the determined values of $x_o$, $y_o$, and $\theta$ are substituted into the formulas 23 to 26 so that the coordinates of the points P and R and the central coordinate ($x_o$, $y_o$) of the rectangular prism structure positioned at the midpoint of the points P and R are determined.

DESCRIPTION OF REFERENCE SYMBOLS

10 OPTICAL DEVICE
16 TELESCOPE
18 OPTICAL AXIS
44 RETICLE
55 CIRCLE
56 VERTICAL LINE (REFERENCE MARK)
90 CYLINDRICAL STRUCTURE
91 EDGE

The invention claimed is:

1. An optical device having a function of measuring a distance from a reference point to a survey point seen on an optical axis of a telescope,
the optical device comprising:
a reticle fixed in the telescope,
the reticle having right and left reference marks provided on both sides of the optical axis and in positions away at a predetermined distance from the optical axis in a horizontal direction; and
a calculation part that calculates central coordinates of a cylindrical structure using coordinates of the reference point of the optical device, coordinates of the point on the cylindrical structure seen on the optical axis in a state where only one of the right and left reference marks coincides with an edge of the cylindrical structure and the optical axis is positioned on a surface of the cylindrical structure, an aperture angle between the optical axis and the reference mark, and a radius of the cylindrical structure.

2. The optical device according to claim 1, wherein the reticle has a plurality of circles drawn around the optical axis as a center.

3. The optical device according to claim 1, wherein the predetermined distance corresponds to about 0.01 radians.

4. The optical device according to claim 2, wherein each of the circles has a radius n times (n: integer) a predetermined length.

5. The optical device according to claim 4, wherein the predetermined length corresponds to about 0.001 radians.

6. The optical device according to claim 4, wherein the circles include a reference circle having a radius 10 times the predetermined length, and wherein
the reference marks touch the reference circle.

7. The reticle to be used together with the optical device according to claim 1.

8. A reticle fixed in a telescope of an optical device having a function of measuring a distance from a reference point to a survey point seen on an optical axis of the telescope,
the reticle comprising:
right and left reference marks provided on both sides of the optical axis and in positions away at a predetermined distance from the optical axis in a horizontal direction, wherein
the optical device has a function of calculating central coordinates of a cylindrical structure using coordinates of the reference point $P_0$ of the optical device, coordinates of the point on the cylindrical structure seen on the optical axis in a state where only one of the right and left reference marks coincides with an edge of the cylindrical structure and the optical axis is positioned on a surface of the cylindrical structure, an aperture angle between the optical axis and the reference mark, and a radius of the cylindrical structure.

9. The reticle according to claim 8, which has a plurality of circles drawn around the optical axis as a center.

10. The reticle according to claim 9, wherein each of the circles has a radius n times (n: integer) a predetermined length.

11. The reticle according to claim 10, wherein the predetermined length corresponds to about 0.001 radians.

12. The reticle according to claim 10, wherein the circles include a reference circle having a radius 10 times the predetermined length, and wherein
the reference marks touch the reference circle.

13. A survey method comprising the steps of:
preparing an optical device that has a function of measuring a distance from a reference point to a survey point seen on an optical axis of a telescope and that comprises a reticle fixed in the telescope,
the reticle comprising:
right and left reference marks drawn on both sides of the optical axis and in positions away at a predetermined distance from the optical axis in a horizontal direction;
allowing only one of the right and left reference marks to coincide with an edge of a cylindrical structure and positioning the optical axis on a surface of the cylindrical structure; and
calculating central coordinates of the cylindrical structure using coordinates of the reference point of the optical device, coordinates of the survey point on the cylindrical structure seen on the optical axis, an aperture angle between the optical axis and the reference mark, and a radius of the cylindrical structure.

* * * * *